(12) United States Patent
Chen et al.

(10) Patent No.: US 6,381,145 B1
(45) Date of Patent: Apr. 30, 2002

(54) COMPUTER ENCLOSURE INCORPORATING A CATCH

(75) Inventors: Yun-Long Chen, Chung-Ho; Yu-Tai Liu, Hsin-Chuang; Kuang-Yu Chen, Tu-Chen; Alvin Liu, Taipei, all of (TW)

(73) Assignee: Hon Hai Precision Inc. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/608,700

(22) Filed: Jun. 29, 2000

(30) Foreign Application Priority Data

Dec. 30, 1999 (TW) .......................................... 088222453

(51) Int. Cl.[7] ................................................. H05K 5/00
(52) U.S. Cl. ........................ 361/752; 361/752; 361/755; 361/753; 312/223.2
(58) Field of Search ................................ 361/752, 753, 361/755, 759, 682, 683; 312/223.2; 220/4.02

(56) References Cited

U.S. PATENT DOCUMENTS

| 5,189,257 A | * | 2/1993 | Borgmeyer et al. ............ 174/50 |
| 5,353,202 A | * | 10/1994 | Ansell et al. ................ 361/818 |
| 5,438,476 A | * | 8/1995 | Steffes ........................ 361/683 |
| 5,694,291 A | * | 12/1997 | Feightner .................... 361/683 |
| 5,713,647 A | * | 2/1998 | Kim ......................... 312/223.2 |
| 6,157,532 A | * | 12/2000 | Cook et al. ................. 361/681 |
| 6,229,710 B1 | * | 5/2001 | Chen .......................... 361/759 |
| 6,231,140 B1 | * | 5/2001 | Chen ....................... 312/223.2 |

* cited by examiner

Primary Examiner—Jayprakash N. Gandhi
Assistant Examiner—Thanh Phan
(74) Attorney, Agent, or Firm—Wei Te Chung

(57) ABSTRACT

A computer enclosure includes a chassis (60) and a hood (10) attached to the chassis. The chassis includes a rear panel (90) defining a slot (91) and a pair of side flanges (71). Each side flange defines a number of cutouts (74) and a number of slits (75) exposed to the cutouts, respectively. The hood has a pair of side walls (30) and a J-shaped catch (40) extending from a rear flange (32) between the side walls. The catch of the hood is received in the slot of the chassis, allowing the hood to be rotatable with respect to the chassis between an open position and a closed position while being selectively removable from the chassis when at the open position. The J-shaped catch engages with the slot for supporting the hood at the open position. Each side wall has a number of latches (31) for being received in the cutouts and moved into the slits of the chassis thereby securely fixing the hood to the chassis when the hood is at the closed position.

9 Claims, 8 Drawing Sheets

COMPUTER ENCLOSURE INCORPORATING A CATCH

BACKGROUND OF THE INVENTION

1. Field of the Invention

The present invention relates to a computer enclosure, and particularly to a computer enclosure having a hood readily opened/closed for facilitating assembly/disassembly.

2. The Related Art

A computer enclosure includes a chassis and a hood attached to the chassis. The hood defines a plurality of apertures for receiving bolts threadedly engaging with inner-threaded holes defined in the chassis for fixing the hood to the chassis. However, fixing the hood to the chassis by bolts is somewhat complicated, laborious and time-consuming.

To solve the above problem, Taiwan Patent Application No. 80215987 discloses a hood attached to a chassis by a hinge and movably guided by a rail. The hood is pivotally connected to the chassis for moving with respect to the chassis, thereby allowing the hood to be opened/closed with respect to the chassis. However, the structure of this computer enclosure is complicated. Furthermore, it will occupy a large amount of space on the assembly line during assembly of other components, since the hood cannot be separated from the chassis. Additionally, the hinge and rail are costly.

The present invention overcomes the above disadvantages by providing an improved structure for mounting a hood to a chassis.

SUMMARY OF THE INVENTION

Accordingly, an object of the present invention is to provide a computer enclosure having a hood with a catch movably received in a slot defined in a chassis for facilitating assembly/disassembly of other components thereto/therefrom.

Another object of the present invention is to provide a computer enclosure having a catch having a simple structure for reduction of cost.

To fulfil the objects mentioned above, a computer enclosure of the present invention comprises a chassis and a hood attached to the chassis. The chassis comprises a rear panel defining a slot, and a pair of side flanges connected to opposite ends of the rear panel. Each side flange defines a plurality of cutouts and a plurality of slits exposed to the cutouts. The hood has a pair of side walls and a J-shaped catch extending therefrom between the side walls. The catch is received in the slot of the chassis, allowing the hood to be rotatable with respect to the chassis between an open position and a closed position while being selectively removable from the chassis when at the open position. The J-shaped catch engages with the slot for supporting the hood at the open position. Each side wall forms a plurality of latches for being received in the cutouts and moveable into the slits of the chassis thereby securely fixing the hood to the chassis when the hood is at the closed position.

BRIEF DESCRIPTION OF THE DRAWINGS

Other objects, advantages and novel features of the present invention will be drawn from the following detailed description of an embodiment thereof with reference to the attached drawings, in which.

DETAILED DESCRIPTION OF THE PREFERRED EMBODIMENT

Figure 1:
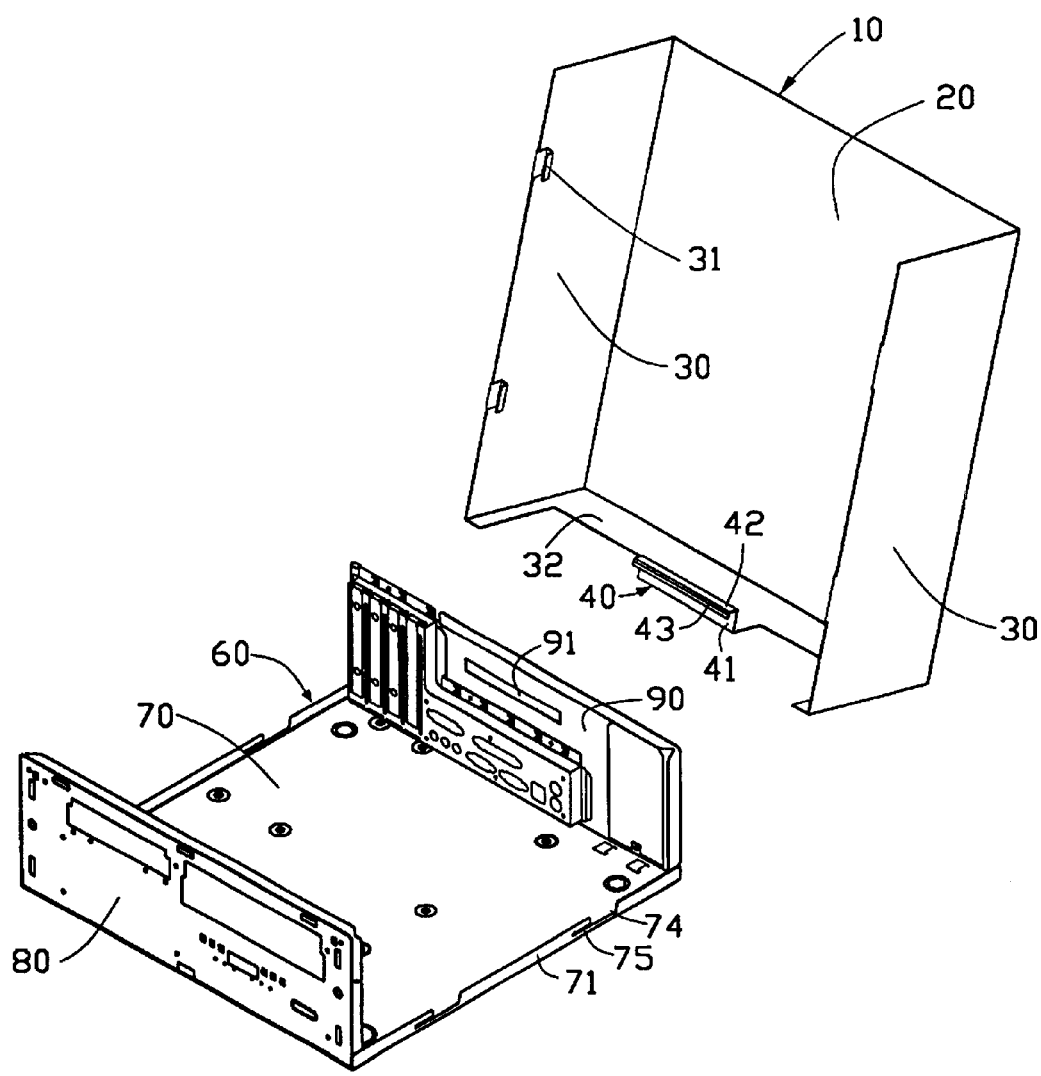
FIG. 1 is an exploded view of a computer enclosure constructed in accordance with the present invention.
Figure 6:
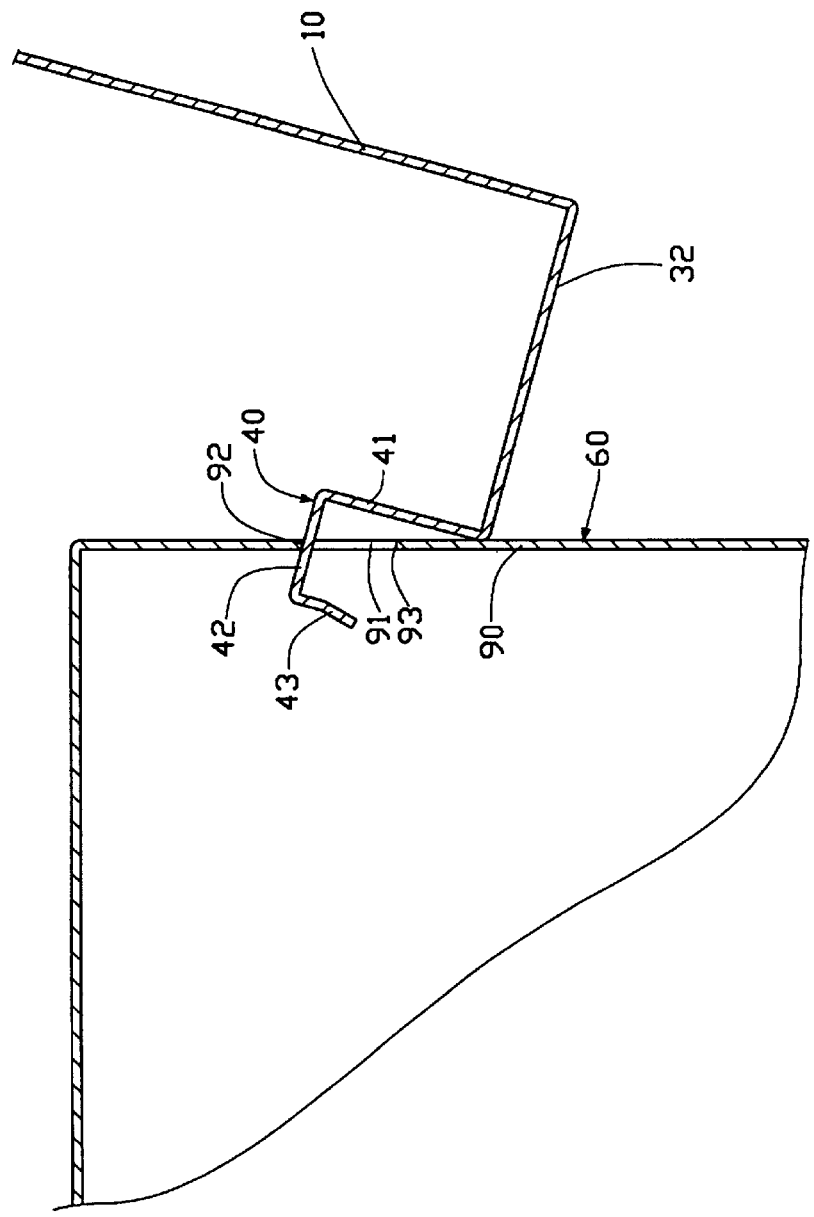
FIGS. 6–8 are schematic views showing different positional relationships between a catch of the hood and a slot of the chassis.

Referring to FIGS. 1 and 6, a computer enclosure of the present invention includes a chassis 60 and a hood 10 releasably attached to the chassis 60. The chassis 60 includes a base 70 with a front panel 80 and a rear panel 90 extending therefrom. A pair of side flanges 71 extend from the base 70 and are connected to opposite ends of the front and rear panels 80, 90. The rear panel 90 defines a slot 91 having a top edge 92 and a bottom edge 93. Each side flange 71 defines a pair of cutouts 74 and a pair of slits 75 exposed to the cutouts 74.

The hood 10 includes a base 20 having a pair of side walls 30 perpendicularly extending from opposite edges of the base 20 and a rear flange 32 perpendicularly extending from the base 20 between the side walls 30. The rear flange 32 forms a catch 40 corresponding to the slot 91 of the rear panel 90. The catch 40 includes a first section 41 perpendicularly and inwardly extending from the rear flange 32 so as to be substantially parallel to the base 20, a second section 42 outwardly and perpendicularly extending from a distal edge of the first section 41, and a third section 43 outwardly and perpendicularly extending from a distal edge of the second section 42, thereby forming a J-shaped configuration. The catch 40 is received in the slot 91 of the chassis 60, allowing the hood 10 to be rotatable with respect to the chassis 60 while being selectively removable from the chassis 60. A pair of latches 31 are stamped on each side wall 30 for being received in the cutouts 74 and moved into and thus engaged with the slits 75 of the chassis 60 thereby securely fixing the hood 10 to the chassis 60.

Figure 2:
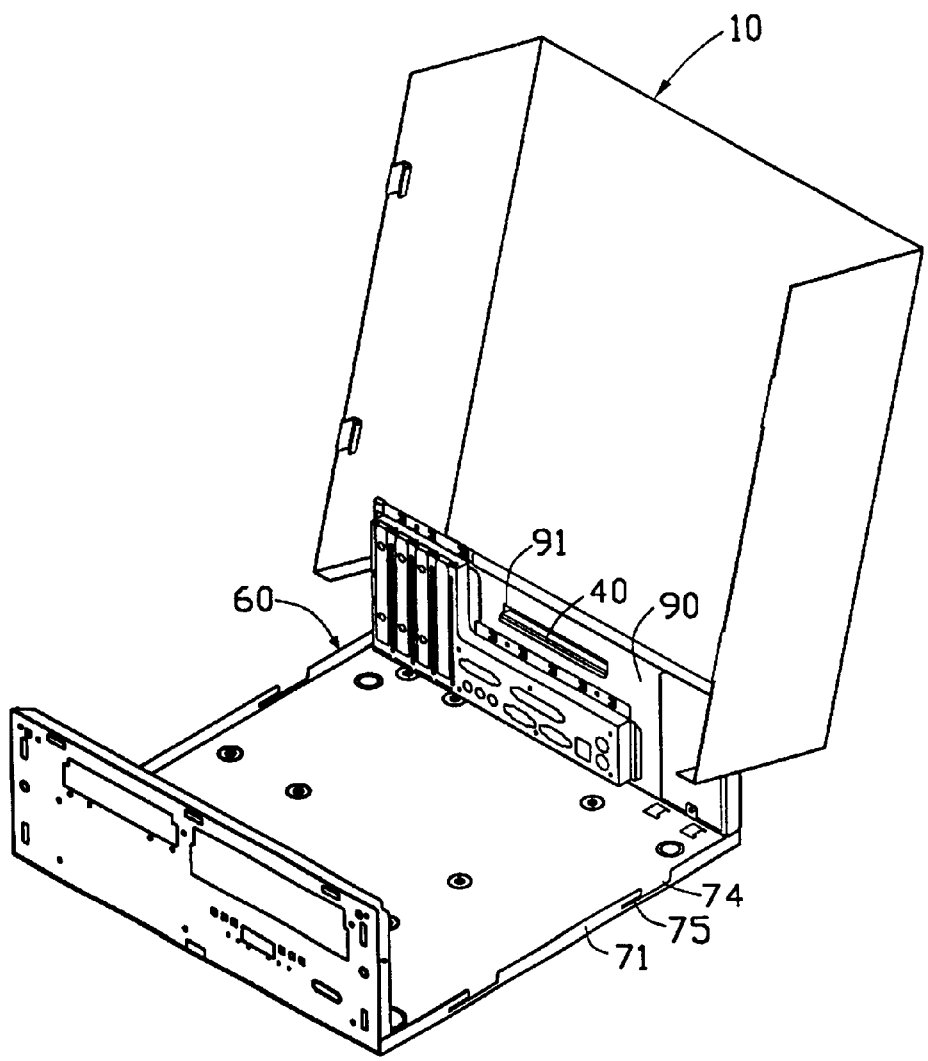
FIGS. 2–4 are assembled views of FIG. 1 showing a procedure for mounting a hood to a chassis of the present invention.
Figure 3:
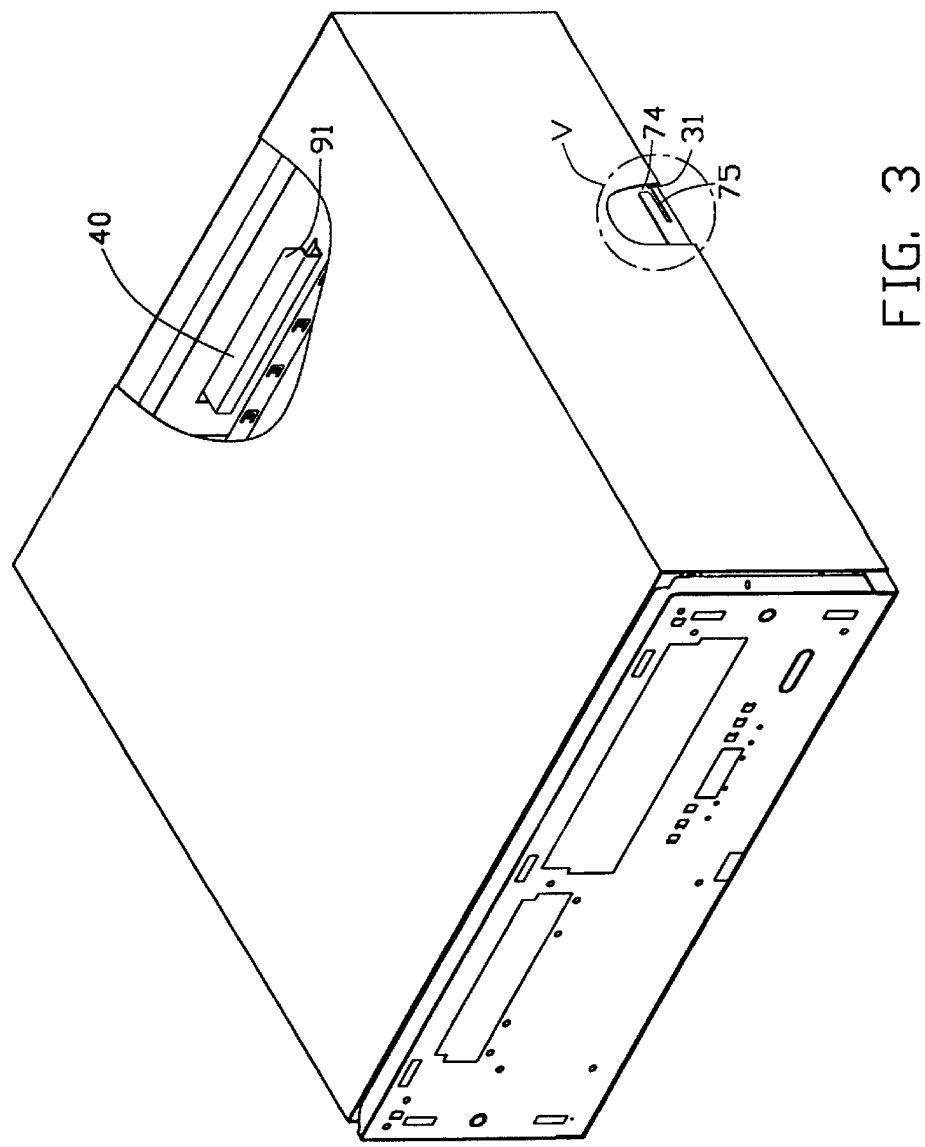
Figure 4:
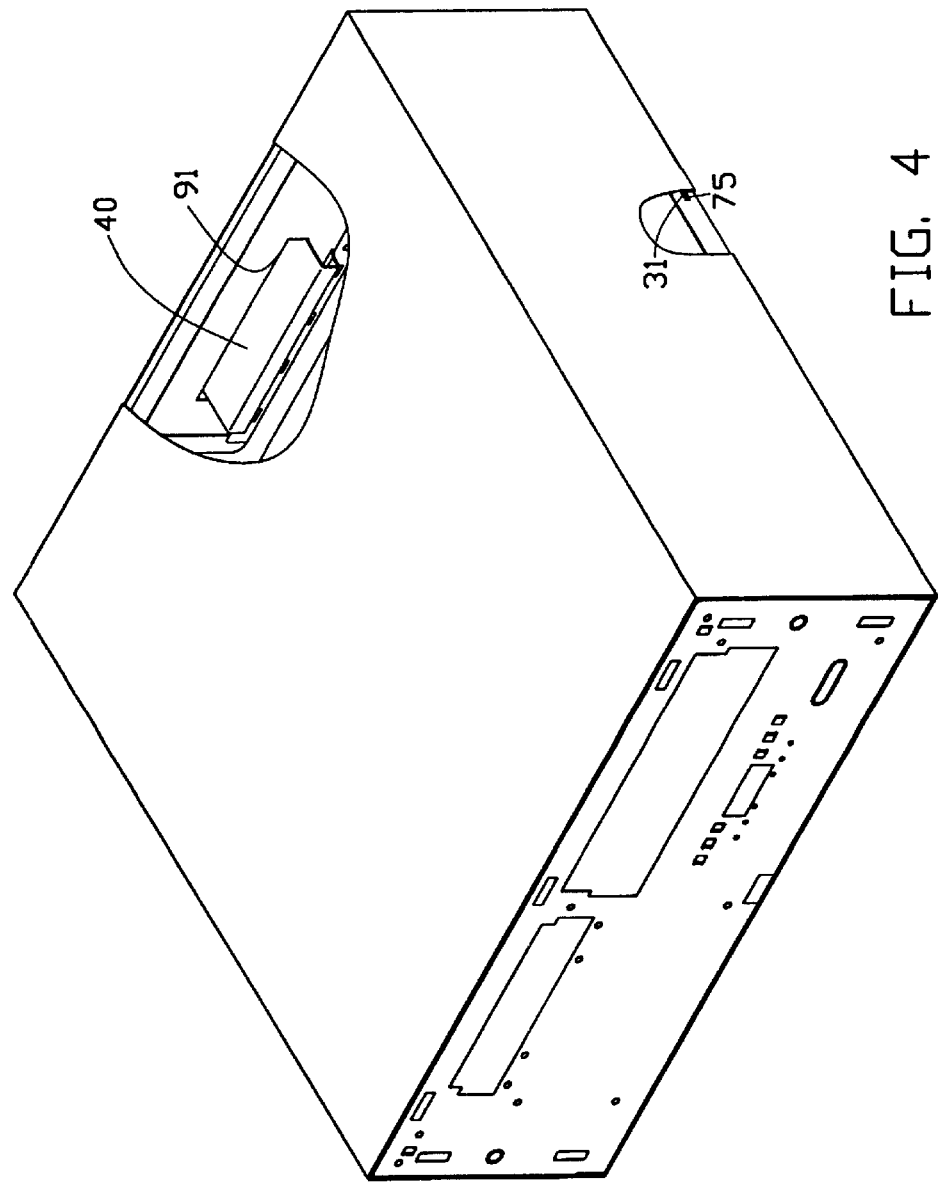
Figure 5:
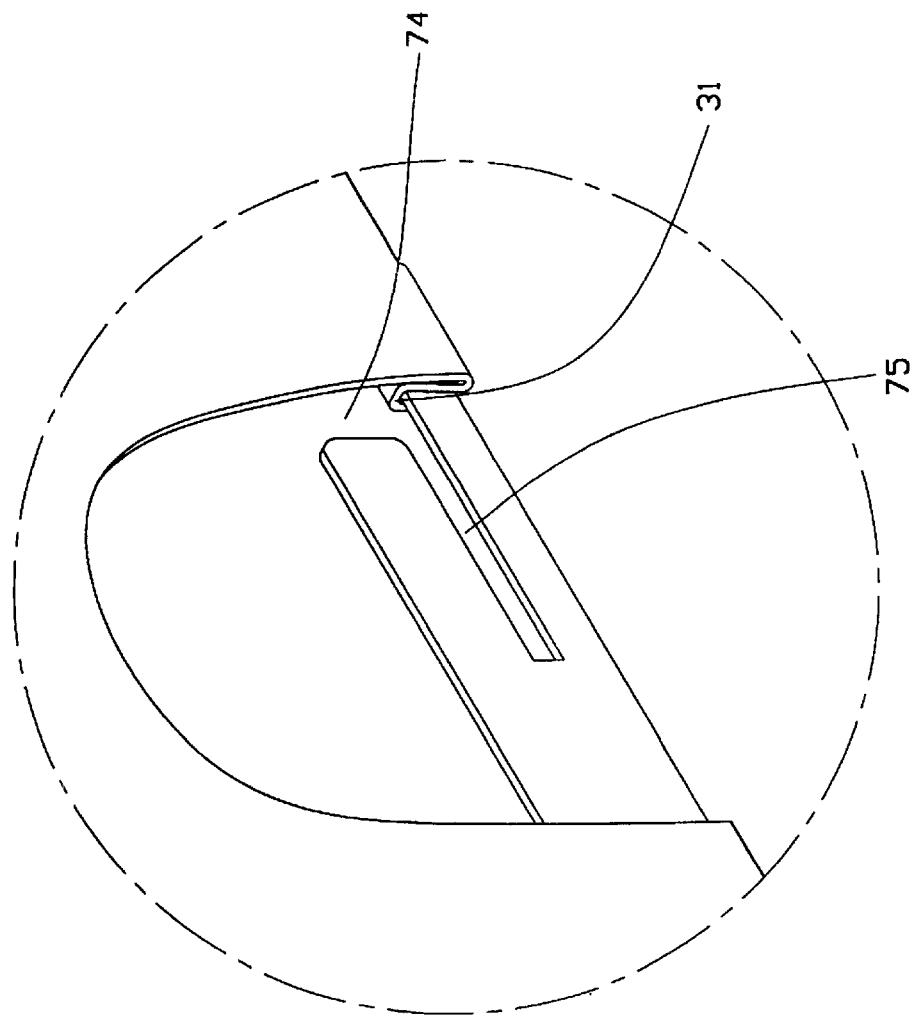
FIG. 5 is an enlarged view of encircled portion V of FIG. 3.

FIGS. 2 and 6 show the hood 10 at a first position with respect to the chassis 60 for exposing the chassis, thereby facilitating assembly of other components (not shown) to the chassis 60. The catch 40 is partially received in the slot 91 of the chassis 60 with the junction of the first section 41 and the rear flange 32 abutting against an outside surface of the rear panel 90, and with the second section 42 engaging with the top edge 92 of the slot 91. The hood 10 is maintained in the open condition by a balance of forces between the weight of the hood 10 and the reaction force between the catch 40 and the rear panel 90 of the chassis 60. If desired, the hood 10 may be separated from the chassis 60 by simultaneously lifting and moving the hood 10 outward to disengage the catch 40 from the slot 91.

Figure 7:
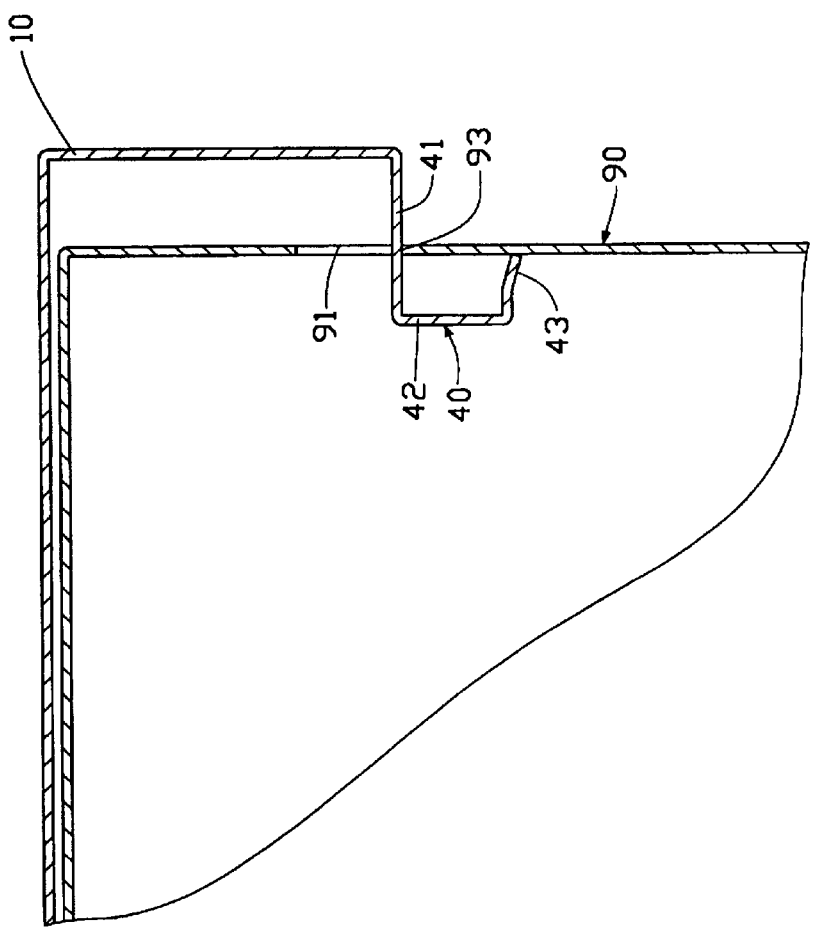
Figure 8:
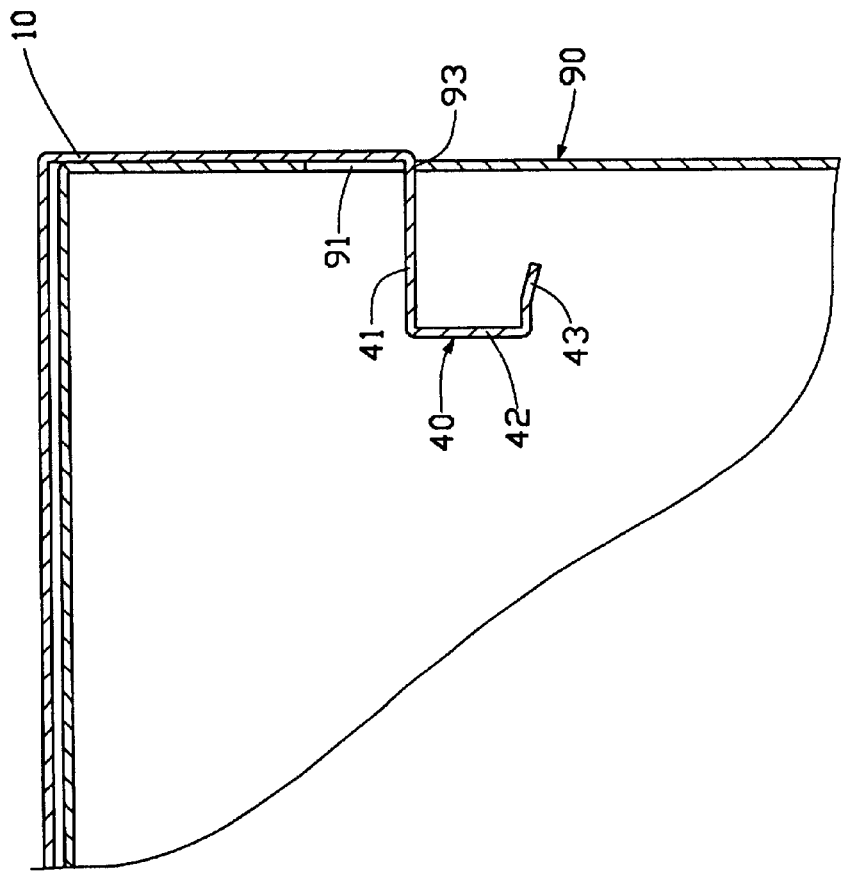

Referring to FIGS. 3–5, 7 and 8, the operation of closing the hood 10 is done by rotating the hood 10 with respect to the chassis 60 from the first position to a closed second position. The catch 40 is rotated so that the second section 42 moves completely into the slot 91 of the chassis 60 and the first section 41 is supported on the bottom edge 93 of the rear panel 90 as shown in FIG. 7 while the latches 31 are received in the cutouts 74 of the chassis 60. The hood 10 is then moved to drive the latches 31 into the slits 75 of the chassis 60 and the first section 41 is completely received in the slot 91 with the rear flange 32 of the hood 10 abutting against the rear panel 90.

To open the hood 10, the hood 10 is moved in a reverse direction to disengage the latches 31 from the slits 75 of the chassis 60 and to bring the third section 43 of the catch 40 to contact the rear panel 90 of the chassis 60. The hood 10 is then reversely rotated with respect to the chassis 60 to detach the catch 40 from the slot 91 of the chassis 60. Thus, the hood 10 is readily detached from the chassis 60.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:

a hood comprising a catch having a first section extending perpendicularly inwardly from an edge of a flange of the hood and being generally parallel to a base of the hood, a second section extending perpendicularly from a distal end of the first section away from the base and being generally perpendicular to the base and a third section extending perpendicularly outwardly from a distal end of the second section and being generally parallel to the first section, the catch thereby forming a J-shaped configuration; and a chassis comprising a rear panel, a slot being defined in the rear panel for receiving the catch, whereby the hood is rotatable with respect to the chassis between an open position where the J-shaped catch engages with the slot and a closed position where the catch is completely received within the slot, and whereby the hood can be readily disengaged from the chassis by withdrawing the catch of the hood from the slot of the chassis.

2. The computer enclosure as described in claim 1, wherein the hood has opposite side walls, a plurality of latches is formed on each side wall, and wherein the chassis has opposite side flanges corresponding to the side walls, and a plurality of slits is defined in each side flange for engagingly receiving the latches, thereby fixing the hood to the chassis at the closed position.

3. The computer enclosure as described in claim 2, wherein a plurality of cutouts is defined in each side flange, each cutout being in communication with the corresponding slit for receiving the corresponding latch of the hood at an intermediate position between the closed position and the open position.

4. A computer enclosure comprising:

a hood comprising a catch extending from a base of the hood, at least one latch being formed on the hood; and a chassis comprising a rear panel and at least one side flange, a slot being defined in the rear panel for engagingly receiving the catch of the hood whereby the hood is detachably rotatable with respect to the chassis between an open position and a closed position, at least one cutout being defined in the flange for receiving the corresponding latch of the hood at an intermediate position between the open position and the closed position, at least one slit being defined in the flange and being in communication with the at least one cutout for engagingly receiving the corresponding latch of the hood and thereby fixing the hood to the chassis.

5. The computer enclosure as described in claim 4, wherein the catch comprises a first section being generally parallel to the base of the hood and a second section extending perpendicularly outward from a distal end of the first section away from the base.

6. The computer enclosure as described in claim 5, wherein the first section and the second section cooperatively form an L-shaped profile.

7. The computer enclosure as described in claim 5, wherein a third section extends perpendicularly from a distal end of the second section and being generally parallel to the first section.

8. The computer enclosure as described in claim 4, wherein a gap of the slot is so small that the catch of the hood is required to be rotatably entered into the slot of the chassis.

9. The computer enclosure as described in claim 4, wherein the catch of the hood has a section generally perpendicular to a base of the hood.

\* \* \* \* \*